United States Patent Office 3,336,258
Patented Aug. 15, 1967

3,336,258
AROMATIC POLYAMIDE-ACIDS CROSS-LINKED WITH DITERTIARY DIAMINES
Rudolph J. Angelo, Wilmington, Del., and John A. Kreuz, Tonawanda, N.Y., assignors to E. I. du Pont de Nemours and Company, Wilmington, Del., a corporation of Delaware
No Drawing. Filed Nov. 26, 1963, Ser. No. 326,235
8 Claims. (Cl. 260—47)

This invention relates to a novel method for the preparation of polyimides.

The resulting polyimides are characterized by a recurring unit having the following structural formula:

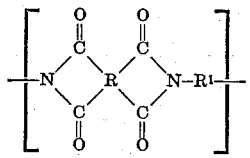

wherein R is an aromatic tetravalent organic radical; and wherein $R^1$ is a divalent organic radical containing at least two carbon atoms.

In patent applications Ser. Nos. 169,119, now U.S. Patent No. 3,179,633, and 169,120, now U.S. Patent No. 3,179,634, assigned to the assignee of the present application are disclosed processes for preparing polyimides which processes are made up of several distinct steps. These steps involve: first, the reaction of certain diamines and dianhydrides under conditions that yield a polyamide-acid composition; second, the formation of the polyamide-acid composition into a shaped article; and, finally, the heating of the shaped article to convert polyamide-acid in the article to polyimide. Such a process is quite slow and, sometimes, not completely successful. One problem is that the freshly cast polyamide-acid film or similar article may be too weak to support itself during the early stages of the conversion operation. It has been found that the article becomes flowable when heat is first applied. The article does not become self-supporting until toughening has begun due to loss of solvent and imidization.

The object of the present invention is to provide a process that overcomes the above-mentioned shortcomings and is easily adapted to continuous operation. Other objects will appear hereinafter.

The process involves the steps of reacting at least one diamine having the structural formula:

$$H_2N-R^1-NH_2$$

wherein $R^1$ is a divalent radical containing at least 2 carbon atoms, the two amino groups of said diamine each attached to separate carbon atoms of said divalent radical; with at least one tetracarboxylic acid dianhydride having the structural formula:

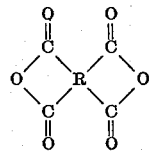

wherein R is a tetravalent aromatic radical in an organic solvent for at least one of the reactants, the solvent being inert to the reactants, for a time and at a temperature sufficient to form a solution in the solvent of a polyamide-acid consisting essentially of recurring units of the formula:

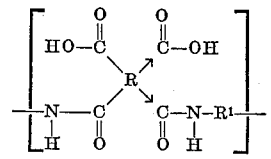

wherein the arrows denote isomerism [1];

R is aromatic; and
$R^1$ is alkylene or arylene;

forming the solution into a shaped article; treating the polyamide-acid solution or the shaped article with a ditertiary saturated aliphatic diamine to form a salt by cross-linking the polyamide-acid through the carboxyl groups; and, thereafter, raising the temperature of the article to at least 150° C. to regenerate the tertiary diamine, to drive off solvent and the tertiary diamine and to convert the crosslinked polymer and polyamide-acid in the article to polyimide. In an optional additional step, the polyimide article may be subjected to a temperature of 300–600° C. for 15 seconds to 20 minutes.

The starting materials for forming the polyamide-acids are organic diamines and aromatic tetracarboxylic acid dianhydrides. The organic diamines are characterized by the formula $$H_2N-R^1-NH_2$$

wherein $R^1$, the divalent radical, may be selected from the following groups: aromatic, aliphatic, cycloaliphatic, combination if aromatic and aliphatic, heterocyclic, bridged organic radicals wherein the bridge is oxygen, nitrogen, sulfur, silicon or phosphorus, and substituted groups thereof. The preferred $R^1$ groups are aromatic, specifically from the following groups: phenylene, naphthylene, biphenylene, anthrylene, furylene, benzfurylene and

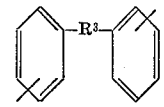

wherein $R^3$ is selected from the group consisting of an alkylene chain having 1–4 carbon atoms, —O—, —S—, —SO$_2$—,

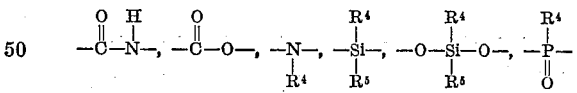

and

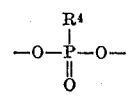

wherein $R^4$ and $R^5$ are alkyl or aryl. Among the diamines which are suitable for use in the present invention are:

metaphenylene diamine;
para-phenylene diamine;

---
[1] In any recurring unit the groups to which arrows point may exist as shown or in interchanged position.

4,4'-diamino-diphenyl propane;
4,4'-diamino-diphenyl methane;
benzidine
4,4'-diamino-diphenyl sulfide;
4,4'-diamino-diphenyl sulfone;
3,3'-diamino-diphenyl sulfone;
4,4'-diamino-diphenyl ether;
2,6-diamino-pyridine;
bis-(4-amino-phenyl) diethyl silane;
bis-(4-amino-phenyl) diphenyl silane;
3,3'-dichloro-benzidine;
bis-(4-amino-phenyl) ethyl phosphine oxide;
bis-(4-amino-phenyl) phenyl phosphine oxide;
bis-(4-amino-phenyl)-N-phenylamine;
bis-(4-amino-phenyl)-N-methyl-amine;
1,5-diamino-naphthalene;
3,3'-dimethyl-4,4'-diamino-biphenyl;
3,3'-dimethoxy benzidine;
2,4-bis(beta-amino-t-butyl)toluene;
bis-(para-beta-amino-t-butyl-phenyl) ether;
para-bis(2-methyl-4-amino-phentyl)benzene;
para-bis-(1,1-dimethyl-5-amino-pentyl) benzene;
m-xylylene diamine;
p-xylylene diamine;
3,3'-diamino adamantane;
3,3'-diamino-1,1'-biadamantane;
3,3'-diaminomethyl-1,1'-biadamantane;
bis(para-amino-cyclohexyl)methane;
hexamethylene diamine;
heptamethylene diamine;
octamethylene diamine;
nonamethylene diamine;
decamethylene diamine;
3-methylheptamethylene diamine;
4,4-dimethylheptamethylene diamine;
2,11-diamino-dodecane;
1,2-bis-(3-amino-propoxy) ethane;
2,2-dimethyl propylene diamine;
3-methoxy-hexamethylene diamine;
2,5-dimethylhexamethylene diamine;
2,5-dimethylheptamethylene diamine;
5-methylnonamethylene diamine;
1,4-diamino-cyclohexane;
1,2-diamino-octadecane;
2,5-diamino-1,3,4-oxadiazole;

$$H_2N(CH_2)_3O(CH_2)_2O(CH_2)_3NH_2$$
$$H_2N(CH_2)_3S(CH_2)_3NH_2$$
$$H_2N(CH_2)_3N(CH_2)_3NH_2$$

and mixtures thereof.

The aromatic tetracarboxylic acid dianhydrides are characterized by the following formula:

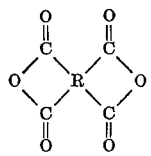

wherein R is a tetravalent aromatic radical, i.e. R is

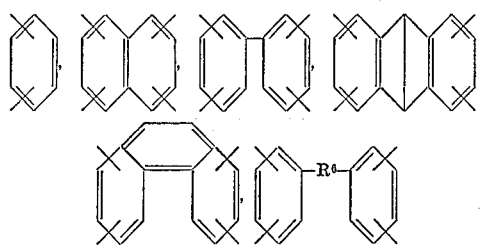

wherein $R^6$ is selected from the group consisting of $R^3$ and

The preferred aromatic dianhydrides are those in which the 4 carbonyl groups of the dianhydride are each attached directly to separate carbon atoms in a ring of the dianhydride and wherein the carbon atoms of each pair of carbonyl groups is directly attached to adjacent carbon atoms in the R group to provide a 5-membered ring as follows:

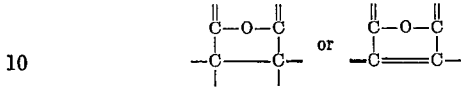

Illustrations of dianhydrides suitable for use in the present invention include:

pyromellitic dianhydride;
2,3,6,7-naphthalene tetracarboxylic dianhydride;
3,3',4,4'-diphenyl tetracarboxylic dianhydride;
1,2,5,6-naphthalene tetracarboxylic dianhydride;
2,2',3,3'-diphenyl tetracarboxylic dianhydride;
2,2-bis(3,4-dicarboxyphenyl) propane dianhydride;
bis(3,4-dicarboxyphenyl) sulfone dianhydride;
3,4,9,10-perylene tetracarboxylic dianhydride;
bis(3,4-dicarboxyphenyl) ether dianhydride;
naphthalene-1,2,4,5-tetracarboxylic dianhydride;
naphthalene-1,4,5,8-tetracarboxylic dianhydride;
decahydronaphthalene-1,4,5,8-tetracarboxylic dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetracarboxylic dianhydride;
phenanthrene-1,8,9,10-tetracarboxylic dianhydride;
2,2-bis(2,3-dicarboxyphenyl) propane dianhydride;
1,1-bis(2,3-dicarboxyphenyl) ethane dianhydride;
1,1-bis(3,4-dicarboxyphenyl) ethane dianhydride;
bis(2,3-dicarboxyphenyl) methane dianhydride;
bis(3,4-dicarboxyphenyl) methane dianhydride;
bis(3,4-dicarboxyphenyl) sulfone dianhydride;
benzene-1,2,3,4-tetracarboxylic dianhydride;
3,4,3',4'-benzophenone tetracarboxylic dianhydride;
etc.

The solvents useful in the solution polymerization process for synthesizing the polyamide-acid compositions are the organic solvents whose functional groups do not react with either of the reactants (the diamines or the dianhydrides) to any appreciable extent. Besides being inert to the system, and preferably, being a solvent for the polyamide-acid, the organic solvent must be a solvent for at least one of the reactants, preferably for both of the reactants. To state it another way, the organic solvent is an organic liquid other than either reactant or homologs of the reactants that is a solvent for at least 1 reactant, and contains functional groups, the functional groups being groups other than monofunctional primary and secondary amino groups and other than the monofunctional dicarboxyl-anhydro groups. The normally liquid organic solvents of the N,N-dialkylcarboxylamide class are useful as solvents in the process. The preferred solvents are the lower molecular weight members of this class, particularly N,N-dimethylformamide and N,N-dimethylacetamide. They may easily be removed from the polyamide-acid and/or polyamide-acid shaped articles by evaporation, displacement of diffusion. Other typical compounds of this useful class of solvents are: N,N-diethylformamide, N,N - diethylacetamide, N,N - dimethylmethoxy acetamide, N-methyl caprolactam, etc. Other solvents which may be used are: dimethylsulfoxide, N-methyl-2-pyrrolidone, tetramethyl urea, pyridine, dimethylsulfone, hexamethylphosphoramide, tetramethylene sulfone, formamide, N-methylformamide and butyrolactone. The solvents can be used alone, in combinations of solvents, or in combination with poor solvents such as benzene, benzonitrile, dioxane, xylene, toluene and cyclohexane.

It should be understood that it is not necessary that the polymeric components of the composition to be formed into a shaped article be composed entirely of the polyamide-acid. This is particularly true since conversion to the polyimide is contemplated subsequently. For purposes of this invention, it has been found that in most instances the polymeric component of the composition should contain at least 50% of the polyamide-acid; and, in a few instances, less than 50% of the polyamide-acid in the polymeric component will operate.

Furthermore, in determining a specific time and a specific temperature for forming the polyamide-acid of a specified diamine and a specified dianhydride, several factors must be considered. The maximum permissible temperature will depend on the diamine used, the dianhydride used, the particular solvent, the percentage of polyamide-acid desired in the final composition and the minimum period of time that one desires for the reaction. For most combinations of diamines and dianhydrides falling within the definitions given above, it is possible to form compositions of 100% polyamide-acid by conducting the reaction below 100° C. However, temperatures up to 175° C. may be tolerated to provide shapeable compositions. The particular temperature below 175° C. that must not be exceeded for any particular combination of diamine, dianhydride, solvent and reaction time to provide a reaction product composed of the desired minimum of polyamide-acid will vary but can be determined by a simple test by any person of ordinary skill in the art. However, to obtain the maximum inherent viscosity, i.e. maximum degree of polymerization, for any particular combination of diamine, dianhydrde, solvent, etc., and thus produce ultimately shaped articles such as films and filaments of optimum toughness, it has been found that the temperature throughout the reaction should be maintained below 60° C., preferably below 50° C.

The degree of polymerization of the polyamide-acid is subject to deliberate control. The use of equal molar amounts of the reactants under the prescribed conditions provides polyamide-acids of very high molecular weight. The use of either reactant in large excess limits the extent of polymerization. Besides using an excess of one reactant to limit the molecular weight of the polyamide-acid, a chain terminating agent such as phthalic anhydride may be used to "cap" the ends of the polymer chains.

In the preparation of the polyamide-acid, it is desired that the molecular weight be such that the inherent viscosity of the polymer is at least 0.1, preferably 0.3–5.0. The inherent viscosity is measured at 30° C. at a concentration of 0.5% by weight of the polymer in a suitable solvent, e.g. N,N-dimethylacetamide.

The quantity of organic solvent used in the process need only be sufficient to dissolve enough of one reactant, preferably the diamine, to initiate the reaction of the diamine and the dianhydride. It has been found that the most successful results are obtained when the solvent represents at least 60% of the final solution. That is, the solution should contain 0.05–40% of the polymeric component.

After forming the polyamide-acid solution, the next step involves forming or shaping the polyamide-acid solution into a shaped article. Shaping can be performed in accordance with a wide variety of procedures. The polyamide-acid solution can be extruded, sprayed, blade-coated or molded. Films of the solution can be conveniently formed by extruding the solution through an orifice onto a belt, drum or similar smooth surface. Foams can be made by the techniques disclosed in U.S. Patent applications Ser. Nos. 266,066 and 266,065, now U.S. Patent No. 3,249,561. The polyamide-acid solution may also be sprayed onto a surface to provide a coating. Spraying is particularly useful for coating irregularly shaped articles and rough surfaces and for impregnating porous materials.

The ditertiary saturated aliphatic diamine having at least three carbon atoms between amino groups is then added. At least 0.2 mole of this damine per polymer unit must be used in order to attain satisfactory gelling of the solution. As mentioned previously, the diamine may be added prior to shaping so that the solution in the gelled condition can be cast much more easily as a relatively thick film on a rotating drum or the like. However, gelation occurs so rapidly that it is generally preferred to cast the polyamide-acid film first before treatment with the ditertiary diamine. Treatment with the ditertiary diamine may be carried out by immersing the polyamide-acid article in a bath of the tertiary diamine alone or a bath of the tertiary diamine in a solvent for the tertiary diamine which is not a solvent for the polyamide-acid, e.g., benzene, toluene, cyclohexane, heptane, carbon tetrachloride, chloroform, tetrahydrofuran, ethyl acetate. The concentration of the amine, the selection of the amine and the time of exposure are determined simply by the amount of gelation required for subsequent handling of the polyamide-acid gel film. The higher the basicity of the diamine, the more complete is its reaction with the polyamide-acid. The larger the amount of crosslinking, the higher is the degree of gelation. Hence, the upper limit in this respect is one crosslink per free carboxyl group in the polymer chain. The minimum is about 0.1 of that frequency.

Representative diamines suitable for crosslinking are the N,N,N',N'-tetra lower alkyl-substituted diamines based preferably on aliphatic diamines such as the following diamines: trimethylene damine; tetramethylene diamine; pentamethylene diamine; hexamethylene diamine; heptamethylene diamine; octamethylene diamine; nonamethylene diamine; decamethylene diamine; 3-methylheptamethylene diamine; 4,4'-dimethylheptamethylene diamine; 2,2-dimethylpropylene diamine; 3-methoxyhexamethylene damine; 2,5-dimethylhexamethylene diamine; 2,5 - dimethylheptamethylene diamine; 5 - methylnonamethylene diamine; bis(para-aminocyclohexyl) methane; 2,11 - diaminododecane; 1,2-bis(3 - aminopropoxy) ethane; 1,4-diaminocyclohexane; 1,12-diaminooctadecane; bis(3 - aminopropoxy)ethane; bis(3 - aminopropyl)sulfide; and bis(3-aminopropyl)methyl amine.

The ditertiary diamines having the necessary basicity for crosslinking bay be characterized by the formula:

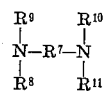

wherein:

$R^7$ is a divalent organic radical of at least 3 carbon atoms, preferably no greater than about 18 carbon atoms, and $R^8$, $R^9$, $R^{10}$ and $R^{11}$ are each lower alkyl (methyl, ethyl, propyl, butyl).

The crosslinked polyamide-acid is characterized by a suitable number (sufficient to provide adequate gelling) of the following units:

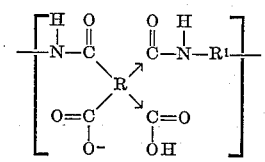

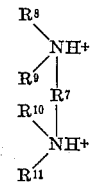

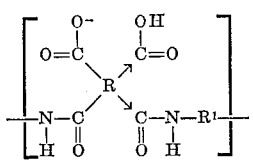

Of course, the other pair of carboxyl groups may also be crosslinked through the diamine to each other or to other polyamide-acid units.

In the last important step, the temperature of the shaped articles raised in order to convert the crosslinked polymer in the article to linear polyimide as described previously. Usually, the temperature is elevated to one in the range of 150–300° C. The use of such temperatures will convert the crosslinked polymer to polyimide within 1 to 3 hours.

The invention will be more clearly understood by referring to the examples which follow, Example 1 representing the best mode contemplated for practicing the invention. It is understood that the examples, although illustrating specific embodiments of the present invention, should not be considered limitative of the invention.

The determination of the structure is accomplished by Infrared Spectral Techniques [2] known to those skilled in the art. The majority of the infrared spectra herein were taken on pressed films by the use of a Perkin-Elmer model 21 Spectrophotometer and a Perkin-Elmer Infracord Spectrophotometer.

Inherent viscosity, which is directly related to the molecular weight of the polymer, is defined by L. H. Cragg in the Journal of Colloid Science, volume I, pages 261–9 (May 1946) as:

$$\text{Inherent viscosity} = \frac{\ln \text{ relative viscosity}}{C}$$

where relative viscosity is the ratio of the solution viscosity to the solvent viscosity, and C is the concentration of solute in solution measured as grams of polymer per 100 ml. of solution.

The preparations of some of the important ingredients used in the examples are given below:

The pyromellitic dianhydride used was obtained as white crystals by sublimation of the commercial product through silica gel at 220–240° C. and 0.25–1 mm. mercury pressure.

N,N-dimethylacetamide was prepared by fractional distillation from phosphorous pentoxide; the fraction distilling at 73° C. and 30 mm. pressure being N,N-dimethylacetamide.

*Example 1*

In a nitrogen atmosphere, 4.0 grams (0.0199 mole) of 4,4'-diamino diphenyl ether and 4.34 grams (0.0199 mole) of pyromellitic dianhydride are mixed with 47.2 grams of N,N-dimethylacetamide while stirring. The reaction is conducted at room temperature (23° C.) and stirring is continued for three hours. N,N'-dimethylacetamide is added to the viscous solution to give a 10% by weight polyamide-acid solution.

Using a 5 mil doctor knife, a film is cast on a glass plate from the solution in N,N'-dimethylacetamide of the polyamide-acid. The freshly cast film is immersed in a bath of N,N,N',N'-tetramethyl hexamethylene diamine for 60 seconds at room temperature. The film gels sufficiently to be removed from the glass, and is found to be self-supporting. It is clamped onto a frame and placed in an oven at 160–180° C. for two hours to convert the polymer to polyimide and to remove solvent, water and the crosslinking diamine. The resulting polyimide has good film properties.

---

[2] W. M. D. Bryant and R. C. Voter, Journal of American Chemical Society, 75, 6113 (1953); and F. W. Billmeyer, "Textbook of Polymer Chemistry," chapter 7, Interscience Publishers 1957.

*Example 2*

Another portion of the same polyamide-acid solution used in Example 1 is cast onto a 6.5 mil polyethylene film with a 10 mil doctor knife. The supported film is immersed in a bath of the same ditertiary amine as in Example 1 for only 30 seconds. After this immersion the clear, self-supporting, gelled film is removed from the polyethylene and clamped onto a frame. The gelled film is heated in this fashion for 5 minutes at 120° C. to give a clear film of the crosslinked polyamide-acid salt, which is then converted to polyimide by heating for one hour at 200° C. while still on the frame. The infrared spectrum of the resulting 0.43 ml. clear, yellow film indicates a very high degree of conversion to polyimide.

Example 2 is repeated, shortening the immersion time in the ditertiary amine to 15 seconds, and the drying time at 120° C. to 3 minutes. After heating for one hour at 120° C., a 0.37 ml. film is obtained. This is found by infrared inspection to consist of good quality polyimide.

*Example 3*

A 10% solution in N,N-dimethylacetamide of a polyamide-acid of pyromellitic acid and 4,4'-diaminodiphenyl ether (inherent viscosity 2.80, measured at 30° C. as a 0.5% solution in N,N-dimethylacetamide) is cast onto polyethylene using a 10 mil and a 25 mil doctor knife to form two films. These supported films are immersed in N,N,N',N'-tetramethyl hexamethylenediamine for 30 seconds. The gelled, self-supporting films are removed from the polyethylene, clamped onto frames and dried at 120° C. for 4 minutes. Conversion of these dry, crosslinked polyamide-acid films to polyimide films is accomplished by heating to 200° C. and maintaining that temperature for one hour, heating gradually at 300° C. and maintaining it for one hour, and finally heating at 380° C. for one minute. The two polyimide films are 1.1–1.3 mils and 1.0–2.4 mils in thickness, respectively. They display tensile moduli of 373,000–383,000 p.s.i., elongations of 5.0–5.7% and tenacities of 11,400–11,700 p.s.i.

*Example 4*

Another portion of the polyamide-acid solution of Example 3 is spun into fibers, which are drawn through a bath of the same ditertiary amine. This produces self-supporting, flexible, gelled fibers. These are clamped onto a frame and heated for 5 minutes at 160° C. They are then gradually heated to 300° C. to convert them to tough polyimide fibers.

*Examples 5–6*

When each of the following diamines is substituted for the dietertiary amine in the first procedure of Example 2, the gel film is easy to remove from the support and the final polyimide film is of satisfactory clarity:

N,N,N',N'-tetramethyl-1,3-trimethylene diamine
N,N,N',N'-tetramethyl-1,4-tetramethylene diamine

*Examples 7–14*

When a film of each of the following polyamide acids is treated with N,N,N',N'-tetramethyl hexamethylenediamine as in Example 2, the polymer changes to the salt of the corresponding polyamide-acid:

Example 7—polyamide-acid of 3,4,3',4'-benzophenonetetracarboxylic dianhydride and m-phenylenediamine
Example 8—polyamide-acid of 3,3',4,4'-diphenyl tetracarboxylic dianhydride and 4,4-diaminodiphenyl ether
Example 9—polyamide-acid of pyromellitic dianhydride and 4,4'-diaminodiphenyl sulfone
Example 10—polyamide-acid of bis(3,4-dicarboxyphenyl) etherdianhydride and 4,4'-diaminodiphenyl propane
Example 11—polyamide-acid of pyromellitic dianhydride and 4,4'-diaminodiphenyl methane
Example 12—polyamide-acid of pyromellitic dianhydride and benzidine Example 13—polyamide-acid of pyromellitic dianhydride and nonamethylene diamine Example 14—polyamide-acid of pyromellitic dianhydride and 1,4-diaminocyclohexane.

Each of these salts converts to the corresponding polyimide when heated at about 200° C.

It is apparent from some of the foregoing examples that improvements in properties of the polyimide products may be obtained by adding a third step of the process. The third step comprises heating the polyimide to a temperature of 300°–600° C. for a short interval (15 seconds to 20 minutes).

The polyimides prepared by the process of this invention find many applications in a wide variety of physical shapes and forms. Among the most significant of these forms are films and fibers. The useful combination of the desirable physical and chemical characteristics of this polymer is unique. Films and fibers of this polymer not only possess excellent physical properties at room temperature, but retain their strength and excellent response to work-loading at elevated temperatures for prolonged periods of time. Behavior of this type offers commercial utility in a wide range of end uses. The polyimide polymers display excellent resistance to corrosive atmospheres, outstanding resistance to degradation by high energy particles and gamma ray radiation. The polymer resists melting upon exposure at 500° C. for extended periods while retaining hitherto unrealized high proportions of room temperature physical properties.

Films of the polyimide may be used wherever films have heretofore been used. They serve advantageously in an extensive variety of wrapping, packaging and bundling applications. Additionally, the polymer in various forms may be used in automobile and aviation interior head lining materials, decorative trim, high temperature electrical insulation such as for slot liners, use in dry transformers, capacitors, coil and cable wrappings, etc., for packaging items to be exposed to high temperature or high energy radiation while within the package, corrosion-resistant pipe, pipe-lagging and duct work containers and container linings, and laminating structures where the films are bonded to the sheet metal or foils.

The film can also serve as a printed circuit backing. Electric circuits can be made by coating the polyimide film with a thin layer of copper or aluminum. The circuit design is covered by a protective coating and the extra metal is etched off followed by washing to a halt the etching. An outstanding advantage of such circuits is that the base film is so stable to heat that they can be connected to other components by a dip soldering technique while in contact with the other components.

The film also can serve as the outer, insulating layers of flat wire and cable assemblies, in which flat wires or metal strips are laminated between layers of polyimide film. Because of the excellent thermal stability of this polymer, such assemblies can be made by depositing strips of molten copper on a polyimide film, followed by the application of another layer of polyimide on the face carrying these strips. The laminated structure can then be slit longitudinally to produce strips of flat wire, each of which is insulated by being imbedded between two polyimide layers, except at the terminations. Such assemblies can be in multilayers, i.e., alternating layers of film and metal. Alternatively, the wire can be coated to have a polyimide coating. The coated wire can then be coated with a second type of polymeric coating, such as silicones, polyamides, polyesters, tetrafluoroethylene and its copolymers with hexafluoropropylene, polyvinyl acetals, e.g. polyvinyl butyral and epoxy resins.

In fiber form, the polymer of the present invention offers possibilities for high temperature electrical insulation, protective clothing and curtains, filtration media, packing and bearing materials, brake linings and clutch facings.

In summary, the polymer has potentiality in a wide variety of applications. Some other possibilities include: as a finish for oven interiors, dryer liner, cooking utensil finish, muffler finish, liner for high temperature plant equipment, liner for hot water heaters, shatter-proof coating for glass in very thin films where high heat is involved (high wattage lamps, Pyrex baking dishes, etc.), as a low friction and high temperature lubricating film, as a flame-retardant paint, in heating elements made by incorporating either metallic conducting strips or conductive coatings of the "Chemelux" type, in belting for use in high temperature conveyors, as a liner for packaging of molten materials and as an underlay for flammable roofing.

What is claimed is:

1. A process for preparing polymeric compositions which comprises treating a polyamide-acid consisting essentially of recurring units of the formula:

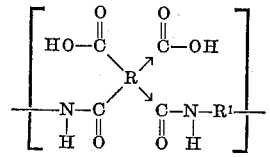

wherein the arrows denote isomerism; sufficient of said recurring units being present to provide a polymer having an inherent viscosity of at least 0.1 as measured at 30° C. on an 0.5% by weight solution in N,N-dimethylacetamide; R is an aromatic tetravalent organic radical selected from the group consisting of

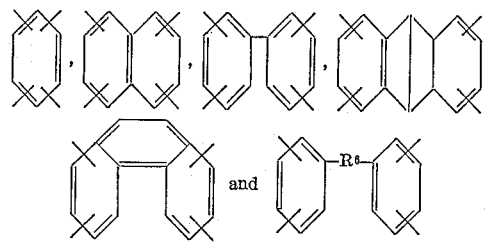

wherein $R^6$ is selected from the group consisting of $R^3$ and

and wherein $R^3$ is selected from the group consisting of an alkylene chain having 1 to 4 carbon atoms, —O—, —S—, —SO$_2$—,

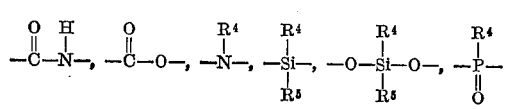

and

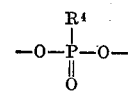

wherein $R^4$ and $R^5$ are alkyl or aryl; and
$R^1$ is a divalent organic radical containing at least two carbon atoms; with at least about 0.2 mole, per recurring unit of said polyamide-acid, of a ditertiary diamine having the formula

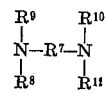

wherein $R^7$ is an organic radical of at least 3 carbon atoms; and $R^8$, $R^9$, $R^{10}$ and $R^{11}$ are each lower alkyl.

2. A process as in claim 1 in which the polyamide-acid is in the form of a film and is treated with said ditertiary amine by immersion of the film in said amine.

3. A film-forming polymer consisting of a substantial number of units of

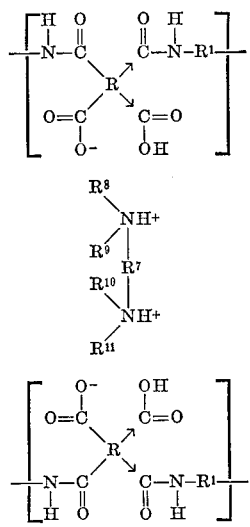

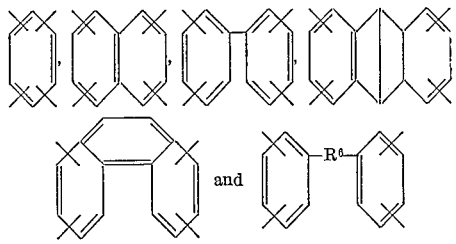

wherein the arrows denote isomerism;

R is an aromatic tetravalent organic radical selected from the group consisting of

 and 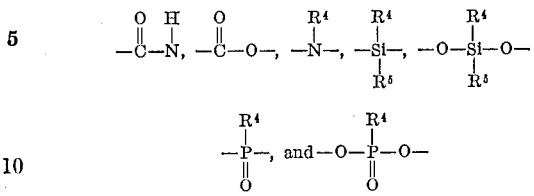

wherein $R^6$ is selected from the group consisting of $R^3$ and $$-\overset{O}{\underset{\parallel}{C}}-$$

and wherein $R^3$ is selected from the group consisting of an alkylene chain having 1 to 4 carbon atoms, —O—, —S—, —SO$_2$—, $$-\overset{O}{\underset{\parallel}{C}}-\overset{H}{\underset{|}{N}},\ -\overset{O}{\underset{\parallel}{C}}-O-,\ -\overset{R^4}{\underset{|}{N}}-,\ -\overset{R^4}{\underset{\underset{R^5}{|}}{Si}}-,\ -O-\overset{R^4}{\underset{\underset{R^5}{|}}{Si}}-O-$$

$$-\overset{R^4}{\underset{\underset{O}{\parallel}}{P}}-,\ \text{and} -O-\overset{R^4}{\underset{\underset{O}{\parallel}}{P}}-O-$$

wherein $R^4$ and $R^5$ are alkyl or aryl;
$R^1$ is a divalent organic radical having at least two carbon atoms;
$R^7$ is an organic radical of at least 3 carbon atoms; and $R^8$, $R^9$, $R^{10}$ and $R^{11}$ are each lower alkyl.

4. The polymer of claim 3 in the form of a self-supporting film.

5. The polymer of claim 3 wherein R is the tetravalent aromatic nucleus in a dianhydride selected from the group consisting of pyromellitic dianhydride, 3,3',4,4'-diphenyl tetracarboxylic dianhydride, bis(3,4-dicarboxyphenyl) ether dianhydride and 3,4,3',4'-benzophenone tetracarboxylic dianhydride.

6. The polymer of claim 3 wherein $R^1$ is the amine-free divalent radical in a diamine selected from the group consisting of metaphenylene diamine, 4,4'-diamino-diphenyl propane, 4,4'-diamino-diphenyl methane, 4,4'-diamino-diphenyl ether, benzidine, nonamethylene diamine, 1,4 - diaminocyclohexane, and 4,4' - diamino - diphenyl sulfone.

7. A polymer as in claim 3 wherein $R^8$, $R^9$, $R^{10}$ and $R^{11}$ are methyl.

8. A polymer as in claim 3 wherein $R^7$ is selected from the group consisting of hexamethylene, tetramethylene and trimethylene.

References Cited
UNITED STATES PATENTS

| | | | |
|---|---|---|---|
| 3,037,966 | 6/1962 | Chow et al. | 260—78 |
| 3,179,633 | 4/1965 | Endrey | 260—78 |
| 3,179,634 | 4/1965 | Edwards | 260—78 |

WILLIAM H. SHORT, *Primary Examiner.*

H. D. ANDERSON, *Assistant Examiner.*